Patented Dec. 8, 1931

1,835,712

UNITED STATES PATENT OFFICE

HARRY KLOEPFER, OF FRANKFORT-ON-THE-MAIN, GERMANY, ASSIGNOR, BY MESNE ASSIGNMENTS, TO THE ROESSLER & HASSLACHER CHEMICAL COMPANY, A CORPORATION OF DELAWARE

PROCESS OF PRODUCING MOLDED ARTICLES CONTAINING ALKALI METALS

No Drawing. Application filed November 20, 1928, Serial No. 320,757, and in Germany November 21, 1927.

This application is a continuation in part of my copending application filed in the United States on Jan. 30, 1928, under Ser. No. 250,716, for a "process for the purification of gases".

It is generally known that the alkali metals poorly suited for many uses on account of their chemical reactivity, relatively low melting points, difficulty in handling, etc.

The chemical industry and its allied industries have long been in need of molded or formed bodies containing alkali metals, which would be solid at the ordinary and even higher than the ordinary temperature compact, and capable of retaining their shape at those temperatures, and which would surpass a body of the pure metal in many fields of use.

I have found that such molded bodies may be produced by compressing an intimate mixture of a finely divided alkali metal with a diluting or distributing material. For example, a mixture such as that obtained by milling or grinding together sodium and sodium chloride in an inert atmosphere, such as hydrogen or nitrogen, may be converted into solid coherent molded bodies such as tablets, briquettes, and the like. The briquetting process can be accomplished at ordinary or higher than the ordinary temperature.

Inert solid substances, such as sodium chloride, soda, wood charcoal, active carbon, sodium hydroxide, and the like, may be used as distributing materials for the alkali metals. Inert substances especially suitable for use are those which are solid at all temperatures at which the alkali metal is in the molten state. The distributing material should be chosen according to the use to which the molded body is to be put. For example, my molded bodies may be used for purifying gases, and in such cases the distributing material should be so chosen that it will give off no constituents, or at least no objectionable constituents, into the gas which is being treated, at the temperature used.

The proportions of alkali metal and of distributing material should also be chosen according to the use to which the molded body is to be put, as well as in accordance with the nature of the distributing and supporting material. Thus, in making a molded body which is to be exposed to high temperatures, I measure the amount of alkali metal to be incorporated with distributing material in such manner that the metal will not drip or run away from the molded body when it is put in use. The amount of alkali metal which I was able to incorporate with the distributing material varied also with the nature of the latter. Thus for instance I have found that molded bodies containing about 85% by weight of sodium chloride and 15% of finely divided sodium metal are able to withstand temperatures around 350° C. without any objectionable flowing away of the liquid sodium from the same. Sodium hydride which I may also use as distributing material will take up and form solid molded bodies with about 20 percent of sodium metal, on account of its finely divided form and because those bodies are not subjected to such high temperatures. If the molded bodies according to my invention are intended for use at ordinary or slightly elevated temperatures only the amount of alkali metal may exceed these limits, as the bodies will retain their shape right up to temperatures approaching the melting point of the alkali metal used. I have found that in cases where I used a very large quantity of alkali metal my bodies reacted throughout.

The use of the molded bodies of my invention offers many advantages over the use of a body of solid or liquid alkali metal. The ease with which the products of my invention may be weighed and handled makes it possible to use them in various shapes as filling materials in towers and the like, through which gases and vapors or liquids are to be passed. A further advantage is that the alkali metal or metals in my molded bodies are present in a state of extreme division, and on this account are in a very reactive condition. Coupled with this, is the fact that my molded bodies are porous, thus permitting the metal particles throughout the mass to be utilized. These novel features of my product overcome the difficulties heretofore experienced when using a body of alkali metal alone, since the surface of the latter often became crusted over, thus excluding the enclosed metal from further action and making necessary the difficult removal of the crusts with a consequent loss of metal. In my molded bodies the total amount of the metal present is practically completely utilized.

My products, prepared by submitting the intimate mixture of finely divided raw materials to pressure, are coherent and compact bodies which retain their shape at ordinary temperatures, but it is a surprising fact that higher temperatures considerably above the melting point of the metal do not cause these properties to disappear. One is able, as mentioned above, to prevent the metal from running away from my products at high temperatures, by choosing the proper proportion of raw materials for the mixture. Thus it is possible to make molded bodies by my invention, which will retain their shape over substantially the whole range of temperatures below the boiling point of the metal or alloy of alkali metals used in the body. My molded bodies can therefore be successfully utilized in high temperature processes, as for example in the purification of gases or vapors.

The molded bodies of this invention are, in general, suitable for all purposes for which alkali metal, in any form, may be used. They have proved especially advantageous for purifying gases or vapors from impurities such as carbon monoxide, hydrogen sulphide, thiophene and the like. They can be used to purify hydrogen for catalytic purposes, and are of special advantage for drying liquids such as ether and the like. My products can be used for chemical reactions of various kinds. For example, I have found that the sodium in one of my briquettes reacts quietly with water and without explosion to evolve hydrogen in an effective and safe manner.

Where I have referred to alkali metals in this specification, it is of course to be understood that I wish these references to include mixtures or alloys of alkali metals also.

Claims:

1. A molded body comprising a coherent mixture of finely divided sodium with sodium chloride.

2. A molded body comprising a coherent mixture of about 15% by weight of finely divided sodium with about 85% by weight of sodium chloride.

3. A composition comprising a mixture of finely divided alkali metal with an alkali metal compound inert to said alkali metal.

4. A composition comprising a mixture of sodium with an alkali metal compound inert to said sodium.

5. A composition comprising a mixture of finely divided sodium with sodium carbonate.

6. A composition comprising a finely divided mixture of sodium with sodium hydride.

Signed at Frankfort-on-the-Main, Germany, this 31st day of October, A. D. 1928.

HARRY KLOEPFER.

CERTIFICATE OF CORRECTION.

Patent No. 1,835,712.   Granted December 8, 1931, to

HARRY KLOEPFER.

It is hereby certified that error appears in the printed specification of the above numbered patent requiring correction as follows: Page 1, line 34, for the word "hydroxide" read hydride; and that the said Letters Patent should be read with this correction therein that the same may conform to the record of the case in the Patent Office.

Signed and sealed this 9th day of February, A. D. 1932.

(Seal)

M. J. Moore,
Acting Commissioner of Patents.